US010462701B2

(12) United States Patent
Susitaival et al.

(10) Patent No.: US 10,462,701 B2
(45) Date of Patent: Oct. 29, 2019

(54) SYSTEM AND METHOD FOR PROVIDING CONTROL INFORMATION FOR APPLICATION-SPECIFIC CONGESTION CONTROL FOR DATA COMMUNICATION

(71) Applicant: TELEFONAKTIEBOLAGET LM ERICSSON (PUBL), Stockholm (SE)

(72) Inventors: Riikka Susitaival, Helsinki (FI); Nianshan Shi, Järfälla (SE); Håkan Palm, Växjö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 5 days.

(21) Appl. No.: 15/235,627

(22) Filed: Aug. 12, 2016

(65) Prior Publication Data
US 2017/0048748 A1 Feb. 16, 2017

Related U.S. Application Data

(60) Provisional application No. 62/205,533, filed on Aug. 14, 2015.

(51) Int. Cl.
*H04W 28/02* (2009.01)
*H04W 48/16* (2009.01)
*H04W 48/18* (2009.01)

(52) U.S. Cl.
CPC ....... *H04W 28/0289* (2013.01); *H04W 48/16* (2013.01); *H04W 48/18* (2013.01)

(58) Field of Classification Search
CPC .. H04W 28/0289; H04W 48/18; H04W 48/16
See application file for complete search history.

(56) References Cited

U.S. PATENT DOCUMENTS

| 9,860,824 | B2* | 1/2018 | Kim | H04W 28/02 |
| 2015/0111536 | A1* | 4/2015 | Sundar | H04W 12/08 |
| | | | | 455/411 |
| 2015/0117213 | A1* | 4/2015 | Pinheiro | H04W 28/0284 |
| | | | | 370/235 |
| 2016/0006625 | A1 | 3/2016 | Guo et al. | |
| 2016/0066259 | A1* | 3/2016 | Guo | H04W 48/02 |
| | | | | 370/230 |
| 2016/0183165 | A1* | 6/2016 | Zhu | H04W 48/06 |
| | | | | 370/230 |

(Continued)

FOREIGN PATENT DOCUMENTS

WO 2015103631 A1 7/2015

OTHER PUBLICATIONS

Intel Corporation. Considerations on RAN2 impacts to support ACDC requirements. 3GPP TSG-RAN WG2 Meeting #90 R2-152151. Fukuoka, Japan, May 25-29, 2015.

(Continued)

Primary Examiner — Rasheed Gidado

(57) ABSTRACT

According to certain embodiments, a method by a network node is provided for providing access control information for Application-specific Congestion Control for Data Communication (ACDC). The method includes determining ACDC barring information that includes at least one of an indication for each one of a plurality of ACDC categories and a bitmap for a plurality of access classes. The network node transmits the ACDC barring information to a wireless device.

21 Claims, 9 Drawing Sheets

(56) References Cited

U.S. PATENT DOCUMENTS

2016/0219493 A1* 7/2016 Kim ............... H04W 48/06
2017/0041854 A1* 2/2017 Kim ............... H04W 28/02
2018/0054760 A1* 2/2018 Chun .............. H04W 24/02

OTHER PUBLICATIONS

3GPP TS 22.001 V12.0.0 (Oct. 2014), 3rd Generation Partnership Project; Technical Specification Group Services and System Aspects; Principles of circuit telecommunication services supported by a Public Land Mobile Network (PLMN) (Release 12), 27 pages, Oct. 2014.
Huawei, HiSilicon, "WI: RAN aspects of Application specific Congestion control for Data Communication (ACDC)", R2-152289, 3GPP TSG-RAN WG2 Meeting #90, Fukuoka, Japan, 7 pages, May 25-29, 2015.
LG Electronics, "New Work Item Proposal on RAN aspects of Application specific Congestion control for Data Communication (ACDC)", RP-150512, 3GPP TSG RAN Meeting #67, Shanghai, China, 6 pages, Mar. 9-12, 2015.

* cited by examiner

SYSTEM AND METHOD FOR PROVIDING CONTROL INFORMATION FOR APPLICATION-SPECIFIC CONGESTION CONTROL FOR DATA COMMUNICATION

PRIORITY

This application claims priority to U.S. Patent Provisional Application No. 62/205,533 filed on Aug. 14, 2015, entitled "System and Method for Providing Control Information for Application-specific Congestion Control for Data Communications," the disclosure of which is hereby incorporated by reference.

TECHNICAL FIELD

Particular embodiments relate generally to wireless communications and more particularly to a system and method for providing control information for Application-specific Congestion Control for Data Communication (ACDC).

BACKGROUND

There are essential services to support communications during disaster situations. To help alleviate highly congested network environments during these situations, it is beneficial to have a mechanism to allow and/or prevent new access attempts from particular operator-defined applications of wireless devices, which may also be referred to as user equipments (UEs). Such mechanisms may be subject to regional regulations.

There may be certain service requirements for Application Specific Congestion Control (ACDC). For example, a service requirement may be that the home network shall be able to configure a wireless device with at least four ACDC categories. Each operator-identified application may then be associated with a selected one of the ACDC categories. Another service requirement may stipulate that the serving network is able to broadcast, in one or more areas of the RAN, control information. The wireless device is then able to control whether or not an access attempt for a certain application is allowed, based on this broadcast barring information and the configuration of ACDC categories in the wireless device.

The ACDC category is defined such that applications for which use is expected to be restricted the least are assigned the highest ACDC category. Applications for which use is expected to be restricted more than applications in the highest category are assigned the second-to-highest ACDC category, and so on. Applications whose use is expected to be the most restricted are either assigned the lowest ACDC category or not any category at all.

Conventionally, the access barring scheme is either based on the BarringFactor and BarringTime, as in LTE Access Class Barring (ACB), or on the barred/not barred flag per UE Access Class between 0 and 9, as in Universal Terrestrial Radio Access Network (UTRAN) ACB. Each wireless device is associated with an Access Class (AC) between 0 and 9. The AC should be randomly allocated to each wireless device such that the population of each AC is equal.

In LTE ACB, access to RAN by a wireless device is controlled by ac-BarringFactor and ac-BarringTime. Regardless of the UE AC, the wireless device must generate a random number that is lower than the threshold ac-BarringFactor in order to access the network. If this mechanism is used for ACDC and for each category, there may be increased overhead in the SIB message size. In UTRAN ACB, each UE AC is assigned a barred/not barred flag, It is recognized that there may be a very large number of ACDC categories. For example, it is anticipated that there may be 256 or more ACDC categories in the future. Providing barring information for a large number of ACDC categories results in substantial SIB message overhead which may not fulfill ACDC service requirements. Additionally, the barring information may be broadcasted per PLMN in a RAN sharing scenario. Thus, where there are six PLMNs active at the same time for a single eNB, the barring information may be broadcasted six times.

SUMMARY

According to some embodiments, systems and methods provide control information for Application-specific Congestion Control for Data Communication (ACDC). Specifically, an access barring scheme may be optimized to better suit ACDC service requirements.

According to certain embodiments, a method by a network node is provided for providing access control information for Application-specific Congestion Control for Data Communication (ACDC). The method includes determining ACDC barring information that includes at least one of an indication for each one of a plurality of ACDC categories and a bitmap for a plurality of access classes. The network node transmits the ACDC barring information to a wireless device.

According to certain embodiments, a network node for providing access control information for Application-specific Congestion Control for Data Communication (ACDC), the network node includes a memory storing instructions and a processor operable to execute the instructions to cause the processor to determine ACDC barring information. The ACDC barring information includes at least one of an indication for each one of a plurality of ACDC categories and a bitmap for a plurality of access classes. The ACDC barring information is transmitted to a wireless device.

According to certain embodiments, a method by a wireless device is provided for determining access to a network based on Application-specific Congestion Control for Data Communication (ACDC). The method includes receiving ACDC barring information from a network node. The ACDC barring information includes at least one of an indication for each one of a plurality of ACDC categories and a bitmap for a plurality of access classes. In response to an application of the wireless device initiating a first connection with the network, wireless device determines based on a particular indication for a particular ACDC category associated with the application that access to the network is barred. In response to the application of the wireless device initiating a second connection with the network, the wireless device determines that access to the network has changed from barred to not barred for the particular ACDC category associated with the application. Based on the bitmap for the plurality of access classes and an access class associated with the wireless device, the wireless device determines whether access to the network by the wireless device is blocked or allowed.

According to certain embodiments, a wireless device includes a memory storing instructions for accessing a network based on Application-specific Congestion Control for Data Communication (ACDC) and a processor operable to execute the instructions to cause the processor to receive ACDC barring information from a network node. The ACDC barring information includes at least one of an indication for each one of a plurality of ACDC categories and a bitmap for a plurality of access classes. In response to an application of the wireless device initiating a first connection with the network, the processor determines based on a particular indication for a particular ACDC category associated with the application that access to the network is barred. In response to the application of the wireless device initiating a second connection with the network, the processor determines that access to the network has changed from barred to not barred for the particular ACDC category associated with the application. Based on the bitmap for the plurality of access classes and an access class associated with the wireless device, the processor determines whether access to the network by the wireless device is blocked or allowed.

Some embodiments of the disclosure may provide one or more technical advantages. For example, in certain embodiments, system information block (SIB) signaling overhead may be reduced. Another advantage may be that ACDC service requirements may be fulfilled. Still another advantage may be that the access barring schemes may not be limited to E-UTRAN but may be also applied to UTRAN. In certain embodiments, the serving network node may be able to simultaneously indicate ACDC with other forms of access control. Still another advantage may be that when both ACDC and access control block (ACB) controls are indicated ACDC shall override ACB. In the case of multiple core networks sharing the same access network, the access network shall be able to apply ACDC for the different core networks individually. For the mitigation of congestion in a shared RAN, barring rates may be set equal for all participating operators.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Systems and methods are disclosed for providing control information for Application-specific Congestion Control for Data Communication (ACDC). In certain embodiments, an access barring scheme may be optimized to better suit ACDC service requirements. Specifically, in certain embodiments, barring information may be provided for each ACDC category. For example, a single bit may be defined as barred/not barred for each ACDC category. Certain embodiments may also smooth access load when the barring is turned off and wireless devices are again able to access to the network. For example, in certain embodiments, an access class bitmap may be broadcast. The access class bitmap may be per ACDC category or may be common to all of the ACDC categories, in particular embodiments. Certain embodiments may provide further optimization where the ACDC Barring Information is signalled only for the highest ACDC category that is barred. Wireless devices may then assume that ACDC categories that are lower than the highest signalled ACDC category are implicitly barred as well.

Figure 1:
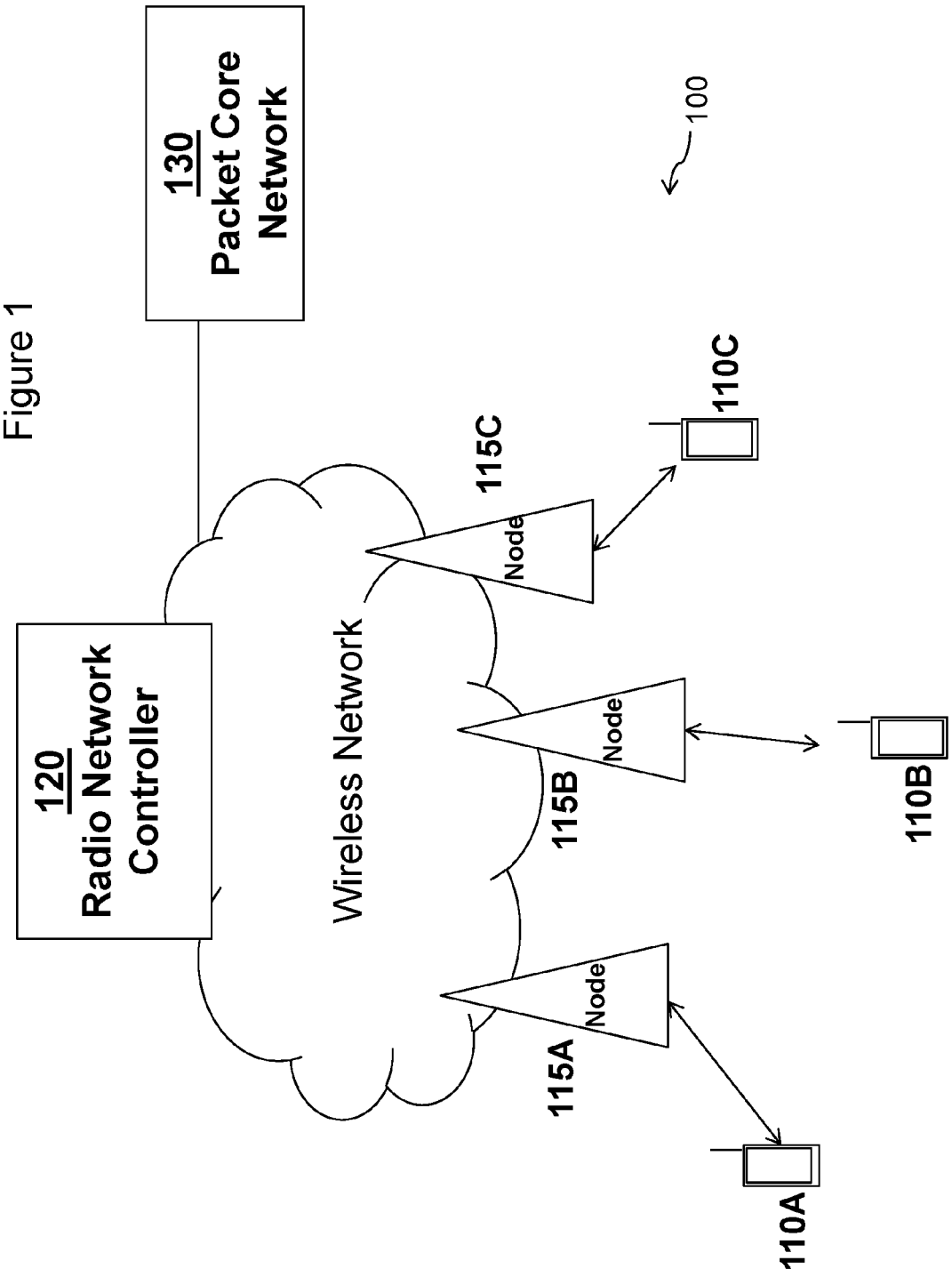
FIG. 1 illustrates an example network for providing access control information for Application-specific Congestion Control for Data Communication (ACDC), according to certain embodiments.

Particular embodiments are described in FIGS. 1-9 of the drawings, like numerals being used for like and corresponding parts of the various drawings. FIG. 1 is a block diagram illustrating embodiments of a network 100 for providing access control information for ACDC, according to certain embodiments. Network 100 includes one or more wireless devices 110A-C, which may be interchangeably referred to as wireless devices 110 or UEs 110, and network nodes 115A-C, which may be interchangeably referred to as network nodes 115 or eNodeBs 115. A wireless device 110 may communicate with network nodes 115 over a wireless interface. For example, wireless device 110A may transmit wireless signals to one or more of network nodes 115A-C, and/or receive wireless signals from one or more of network nodes 115A-C. The wireless signals may contain voice traffic, data traffic, control signals, and/or any other suitable information. In some embodiments, an area of wireless signal coverage associated with a network node 115 may be referred to as a cell. In some embodiments, wireless devices 110 may have D2D capability. Thus, wireless devices 110 may be able to receive signals from and/or transmit signals directly to another wireless device 110. For example, wireless device 110A may be able to receive signals from and/or transmit signals to wireless device 110B.

In certain embodiments, network nodes 115 may interface with a radio network controller (not depicted in FIG. 1). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT, or any suitable network node. Example embodiments of network nodes 115, wireless devices 110, and other network nodes (such as radio network controller or core network node) are described in more detail with respect to FIGS. 2, 3, and 9, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques for providing access control information for ACDC described herein are applicable to both LAA LTE and standalone LTE operation in license-exempt channels. The described techniques are generally applicable for transmissions from both network nodes 115 and wireless devices 110.

Figure 2:
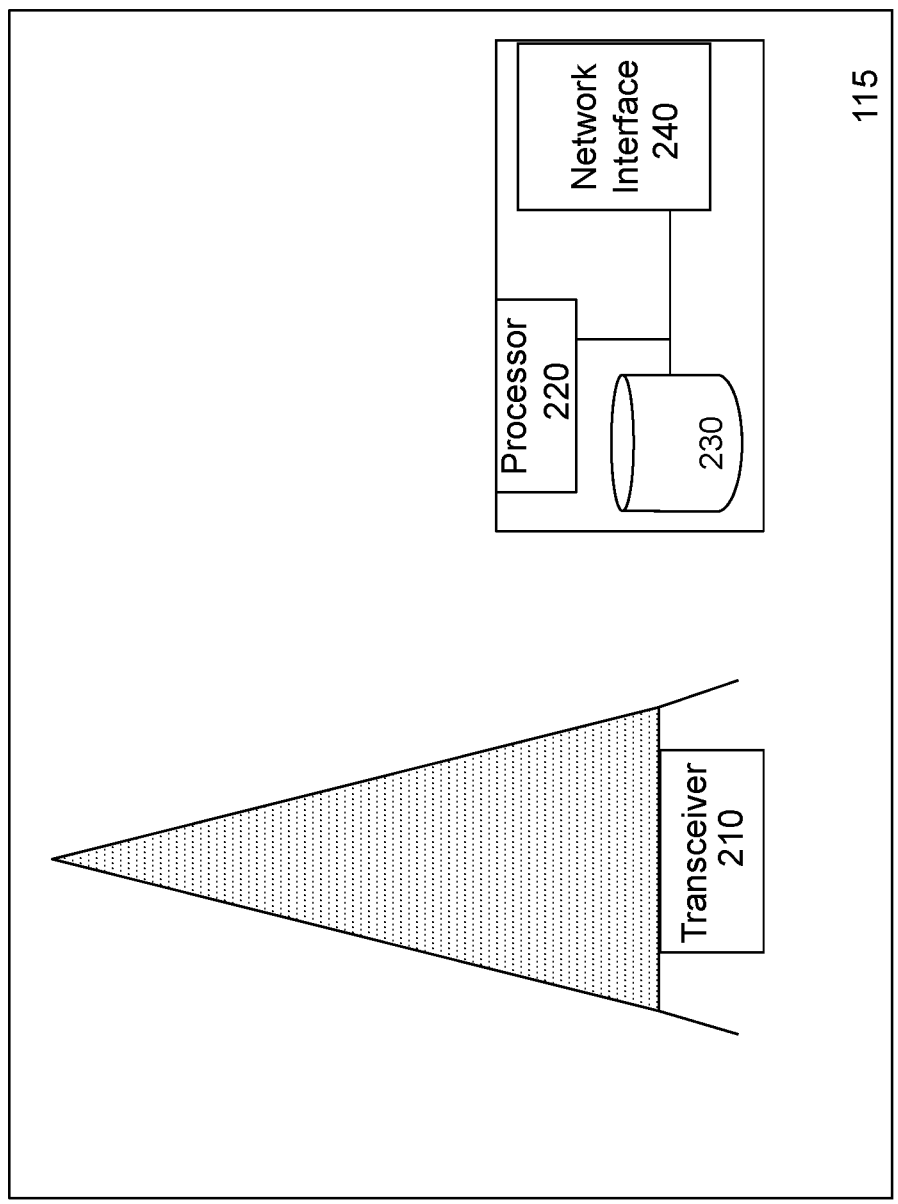
FIG. 2 illustrates an example network node for providing access control information for ACDC, according to certain embodiments.

FIG. 2 is a block diagram illustrating a radio network node 115 providing access to a network based on ACDC, according to certain embodiments. As described above, network node 115 may be any type of radio network node or any network node that communicates with a wireless device and/or with another network node. Examples of a network node 115 are provided above.

Network nodes 115 may be deployed throughout network 100 as a homogenous deployment, heterogeneous deployment, or mixed deployment. A homogeneous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 210, processor 220, memory 230, and network interface 240. In some embodiments, transceiver 210 facilitates transmitting wireless signals to and receiving wireless signals from wireless device 110 (e.g., via an antenna), processor 220 executes instructions to provide some or all of the functionality described above as being provided by a radio network node 115, memory 230 stores the instructions executed by processor 220, and network interface 240 communicates signals to backend network components, such as a gateway, switch, router, Internet, Public Switched Telephone Network (PSTN), core network nodes 130, radio network controllers 120, etc.

In certain embodiments, network node 115 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 220 may include any suitable combination of hardware and software implemented in one or more modules to execute instructions and manipulate data to perform some or all of the described functions of network node 115. In some embodiments, processor 220 may include, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to processor 220 and may refer to any suitable device operable to receive input for radio network node 115, send output from network node 115, perform suitable processing of the input or output or both, communicate to other devices, or any combination of the preceding. Network interface 240 may include appropriate hardware (e.g., port, modem, network interface card, etc.) and software, including protocol conversion and data processing capabilities, to communicate through a network.

Other embodiments of network node 115 may include additional components beyond those shown in FIG. 2 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 3:
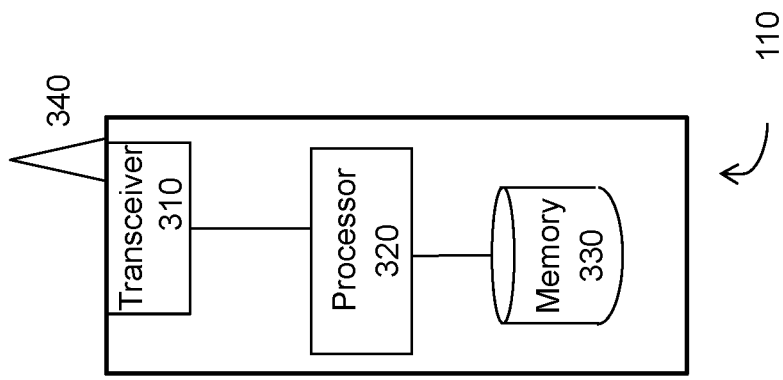
FIG. 3 illustrates an example wireless device for accessing a network based on ACDC, according to certain embodiments.

FIG. 3 is a block diagram illustrating certain embodiments of a wireless device 110 for accessing a network based on ACDC, according to certain embodiments. As depicted, wireless device 110A-C includes transceiver 310, processor 320, and memory 330. In some embodiments, transceiver 310 facilitates transmitting wireless signals to and receiving wireless signals from radio network node 115 (e.g., via an antenna), processor 320 executes instructions to provide some or all of the functionality described above as being provided by wireless device 110, and memory 330 stores the instructions executed by processor 320. Examples of a wireless device 110 are provided above with respect to FIG. 1.

Processor 320 may include any suitable combination of hardware and software implemented in one or more modules to execute instructions and manipulate data to perform some or all of the described functions of wireless device 110. In some embodiments, processor 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 3 that may be responsible for providing certain aspects of the wireless device's functionality, including any of the functionality described above and/or any additional functionality (including any functionality necessary to support the solution described above).

Figure 4:
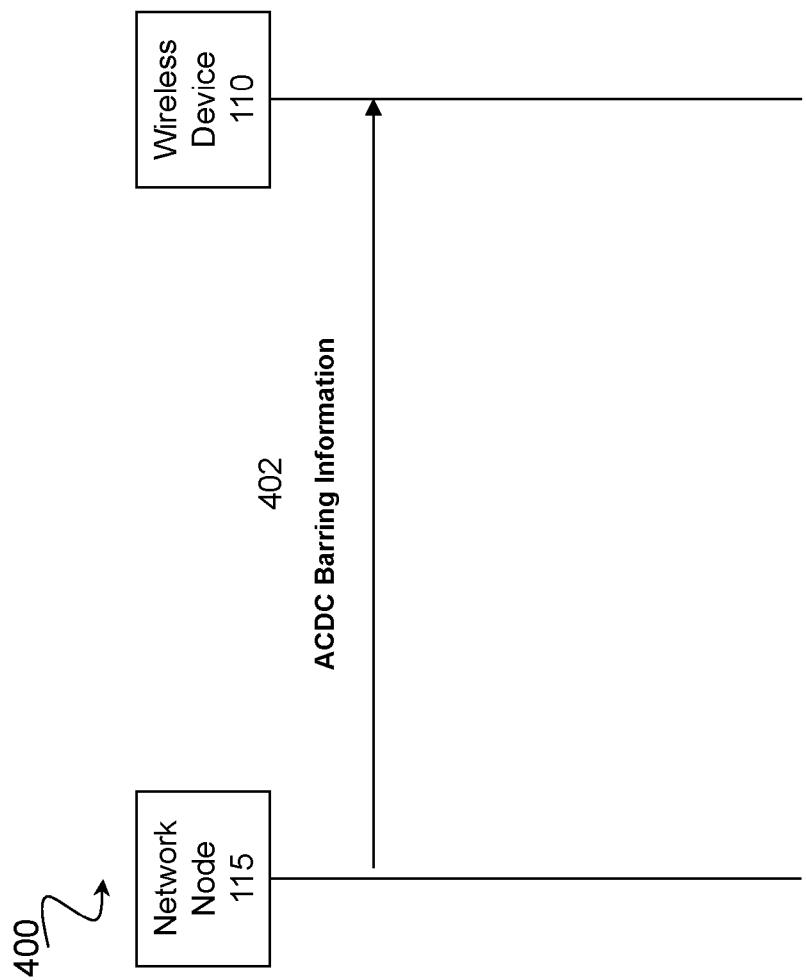
FIG. 4 illustrates an exemplary message sequence chart for transmitting ACDC control information, according to certain embodiments.

FIG. 4 illustrates an exemplary message sequence chart 400 for transmitting ACDC control information, according to certain embodiments. As illustrated, ACDC barring information may be provided from network node 115 to wireless device 110 to prevent access to network 100 by wireless device 110. The ACDC barring information may include an ACDC system information block (SIB) 402 that includes barring information for each public land mobile network (PLMN) in the list. In certain embodiments, the ACDC SIB may include barring information for the ACDC categories and an indication of whether or not the barring information applies to a roaming wireless device 110.

According to certain embodiments, a UTRAN implementation may reuse the existing mechanism providing a barred/not barred flag as used in UTRAN ACB. Table 1 below is such an implementation:

TABLE 1

| Information Element/ Group name | Multi | Type and reference | Semantics description |
|---|---|---|---|
| Access Class Barred list | maxAC | | Default is no access class barred is applied. The first instance of the parameter corresponds to Access Class 0, the second to Access Class 1 and so on up to Access Class 15. Wireless device 110 reads this information element of its access class stored in SIM. |
| >Access Class Barred | | Enumerated (barred, not barred) | |

In this embodiment, wireless device 110 may be notified when the SIB is changed due to the change of barring information. This leads to increased SIB update notifications and SIB reading. In the UTRAN ACB implementation, each AC class is barred/not barred individually.

According to certain other embodiments, a UTRAN implementation may reuse the existing mechanism as in UTRAN Access Groups (AG) based access control barring. Table 2 is an exemplary implementation of UTRAN AG Based ACB:

TABLE 2

| Information Element/Group name | Need | Multi | Type and reference | Semantics description |
|---|---|---|---|---|
| Dedicated Traffic Channel (DTCH) transmission blocking | OP | | Bit string(maxNumAccessGroups) | Bit 0 is the first/leftmost bit of the bit string. Bit n corresponds to the n-th defined Access Group. Value '1' for a bit means the DTCH transmissions for wireless devices in that Access Group are blocked when wireless device 110 is in CELL_FACH state and CELL_PCH state with seamless transition to CELL_FACH state. |
| Expiration Time Factor 2 | MD | | Expiration Time Factor 2 10.3.3.12b | Default is 1. |

In this option, wireless device 110A-C reading of the SIB is controlled by the Expiration Time Factor. There is no need for SIB notification for the change of the barring information.

In certain embodiments, the transmitted ACDC barring information 402 may include an indication for a plurality of ACDC categories and a bitmap for a plurality of access classes. Thereafter, when an application of the wireless device initiates a first connection with the network 100, wireless device 110 may determine based on the indication and a particular ACDC category associated with the application that access to the network is barred. In response to the application of the wireless device initiating a second connection with the network, wireless device 110 may determine that access to the network has changed from barred to not barred. Based on the bitmap for the plurality of access classes and an access class associated with the wireless device, wireless device 110 may then determine whether to block or allow access to the network for the application.

In certain particular embodiments, network node 115A-C or another network node indicates the ACDC barring information by a single on-off indication. For example, a bit string may be defined so that each bit corresponds to a defined group. Thus, one bit may be defined per ACDC category. Specifically, in a particular embodiment, a first value for the one bit may indicate to wireless device 110 that the particular ACDC category is barred, and a second value for the one bit may indicate to wireless device 110 that the particular ACDC category is not barred. For example, a value of "1" may mean the category is barred, whereas a value of "0" may mean the category is not barred. Using this method for ACDC control, there may be less impact on the legacy wireless devices 110A-C since there will be no need for SIB notifications for the change of ACDC barring information. Additionally, each ACDC category may be barred or not barred individually.

In certain other embodiments, the ACDC barring information comprises information for a highest ACDC category that is barred. When determining whether access to the network 100 has changed from barred to not barred, wireless device 110 may determine if the particular ACDC category to which the application seeking access belongs is higher than the highest ACDC category that is barred.

In certain embodiments, the bitmap may be transmitted with the indication of ACDC barring information. In other embodiments, the bitmap and the indication of ACDC barring information may be transmitted periodically and in alternate transmissions. In any case, the bitmap may include a plurality of bits. Each of the plurality of bits may indicate whether an associated one of the plurality of access classes is barred. In a particular embodiment, the bitmap may include access class barring information that is common to the ACDC categories.

According to certain other embodiments, an LTE approach may be adopted by using barring factor and barring time. An exemplary LTE ACB implementation is provided:

```
AC-BarringConfig ::=    SEQUENCE {
    ac-BarringFactor       ENUMERATED {
                              p00, p05, p10, p15, p20, p25, p30, p40,
                              p50, p60, p70, p75, p80, p85, p90, p95},
    ac-BarringTime         ENUMERATED {s4, s8, s16, s32, s64, s128, s256, s512},
    ac-BarringForSpecialAC BIT STRING (SIZE(5))
}
```

In this example implementation, if the random number drawn by the wireless device 110 is lower than the ac-BarringFactor, access is allowed. Otherwise, the access is barred. The values are interpreted in the range [0,1): p00=0, p05=0.05, p10=0.10, . . . , p95=0.95. Values other than p00 can only be set if all bits of the corresponding ac-BarringForSpecialAC are set to 0. The ac-BarringTime may indicate the access barring time value in seconds. The ac-BarringForSpecialAC may identify access class barring for AC 11-15. The first/leftmost bit is for AC 11, the second bit is for AC 12, and so on. In this option, wireless device 110A-C access to RAN may be controlled by ac-BarringFactor and ac-BarringTime. Wireless device 110A-C must generate a random number that is lower than the threshold ac-BarringFactor in order to access. In the LTE implementation, AC class 0 to 9 is treated in one group. In a particular embodiment, each ACDC category may have its own barring factor and barring time. However, such an implementation increases the SIB message size.

ACDC service requirements stipulate that most of time, if the wireless device's category is barred, all wireless devices 110A-C in that category should be barred. In fact, when a category is barred, most likely the ACDC categories under it will also be barred. There is rarely a situation that only a fraction or portion of wireless devices 110 in the category will be barred. Thus, in particular embodiments, it may be assumed that the number of categories provide sufficient granularity. Single bit (barred/not barred) per category is sufficient for broadcast information.

In certain embodiments, the existing SIB (i.e., SIB 2 or SIB 3) that is read by the idle wireless device 110A-C may be extended. In other embodiments, a new SIB may be introduced for ACDC access control. An example of the implementation of a new SIB embodiment is shown in TABLE 3 below:

granularity. In certain other embodiments, a single bit on/off indication per category may be sufficient for broadcast information. However, there may be concerns that when a certain category is allowed again an overload situation occurs. For this, some finer granularity can be provided. The easiest way is to reuse EAB barring parameters where a bitmap of ten bits is broadcasted. By this way, the network can allow only part of the wireless devices 110A-C to access in controlled manner.

In certain embodiments, the one bit indication and the bitmap can be signaled as alternatives to reduce signaling load and smooth access load when barring is turned off. Specifically, in a particular embodiment, CHOICE structure in ASN.1 can be used for this purpose. An example of such signaling is provided below:

```
acdc-perCat-r12          CHOICE {
    barringBit-r12            ENUMERATED {true},
    barringBitmap-r12         BIT STRING (SIZE (10))
}
```

TABLE 3

| Information Element/Group name | Need | Type and Multi reference | Semantics description |
|---|---|---|---|
| ACDC Parameters | OP | | |
| >ACDC Parameters Per PLMN | | 1 to 6 | The PLMN list |
| >>ACDC Category | MD | ACDC-Cat | Indicating the highest barred ACDC Category. All the categories lower than the indicated is barred implicitly. |
| >> BarredFlag | MD | Enumerated (barred, not barred) | |
| >>Expiration Time Factor | MD | Expiration Time Factor | the UE shall, when the timer expires, perform an update of the information |
| >>IndicationForRoamingUE | OP | Enumerated (ACDC-control-applied) | Absence of this IE implies a roaming UE shall not be subject to ACDC control for the PLMN |

E-UTRAN implementations may also be provided. For example, in certain embodiments, the number of ACDC categories may be limited to 16 and Core Network and Terminal Working Group 1 may be informed of such a limitation. In LTE, there are basically two different solutions for the access barring scheme: Rel-8 ACB mechanism and Rel-11 EAB. Rel-8 ACB is based on barring probability and timer. For example, wireless device 110 may draw a random number and if it under the threshold, then wireless device 110 is barred over a randomly selected time period. When timer identifies the expiration of the randomly selected time period, wireless device 110 may again try the barring test. By contrast, the Rel-11 EAB mechanism is based on bitmap similar to UTRAN ACB, described above. For each access class (AC 0-9), there may be an explicit bit to indicate if the wireless device 110A-C may access network 110 or not. The two described mechanisms are just two examples. Any suitable mechanism providing access barring may be used.

In certain embodiments, if a wireless device's category is barred, all wireless devices 110 in that category will also be barred. There is rarely a situation when only a fraction or portion of wireless devices 110 in a category should be barred. The number of categories may provide sufficient Overhead of this structure may typically be only 1 bit per category. As in the barring information, there are only explicit bits (not random timers). The barring test may also be simple to specify and test similar to EAB. An alternative may be to introduce a new SIB or add bits to SIB2.

In certain other embodiments, to smooth access load when turning off the ACDC barring, one single bitmap may be introduced that is common to all the ACDC categories. For example, a single 10-bit bitmap for ten different access classes may be introduced. For example, in a particular embodiment, if wireless device 110 was previously barred based on on-off barring bit (common bit for the whole category), the wireless device 110 should check the common bitmap. In a particular example embodiment, a value of 0 may indicate that the access class is not barred. Accordingly, when the barring bit for the particular access class to which wireless device 110 belongs is 0, wireless device may be allowed to access network 100 again.

In another example embodiment, the ACDC barring information may be signaled only for the highest category that is barred. Lower ACDC categories may be implicitly barred as well. In this embodiment, wireless device 110 may determine if the category to which the wireless device 110 belongs or any higher category is barred. If that category or a higher category is barred, then wireless device 110 is barred. It is generally recognized, however, that this solution may be used with the previous embodiments or any other barring solution.

In still another example embodiment, the ACDC barring information may be signaled for the highest ACDC category that is barred, together with an Expiration Time. This Expiration time may indicate when a wireless device 110 that is subject to ACDC barring shall re-read system information in order to determine whether the ACDC barring information has changed. This solution can be used with the previous embodiments or any other barring solution.

Figure 5:
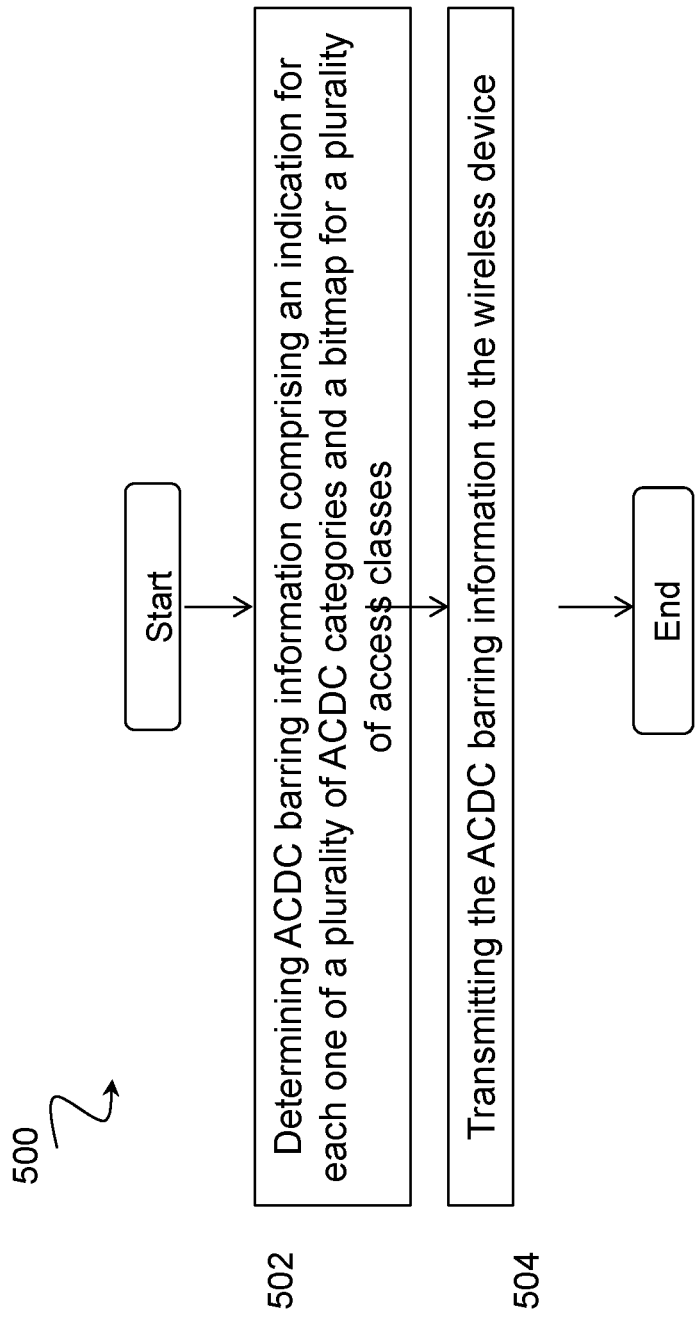
FIG. 5 illustrates an example method for providing access control information for ACDC, according to certain embodiments.

FIG. 5 illustrates an exemplary method 500 by a network node 115 for providing access to a network based on ACDC, in accordance with certain embodiments. The method begins at step 502 when network node 115 determines ACDC barring information. The ACDC barring information may include at least one of an indication for a plurality of ACDC categories to a wireless device and a bitmap for a plurality of access classes.

In a particular embodiment, the indication for a particular ACDC category may include one bit, such that a first value for the one bit may indicate that the particular one of the plurality of ACDC categories is barred and a second value for the one bit may indicate that the particular one of the plurality of ACDC categories is not barred. For example, a 0 may indicate that the ACDC category is barred and a 1 may indicate that the ACDC category is not barred. In a particular embodiment, the bitmap may include a plurality of bits, and each bit may indicate whether an associated one of a plurality of access classes is barred.

At step 504, network node 115 may transmit the ACDC barring information to the wireless device. In a particular embodiment, a first communication may be transmitted to the wireless device that includes the indication for each one of the plurality of ACDC categories. A second communication may be transmitted to the wireless device that includes the bitmap.

Figure 6:
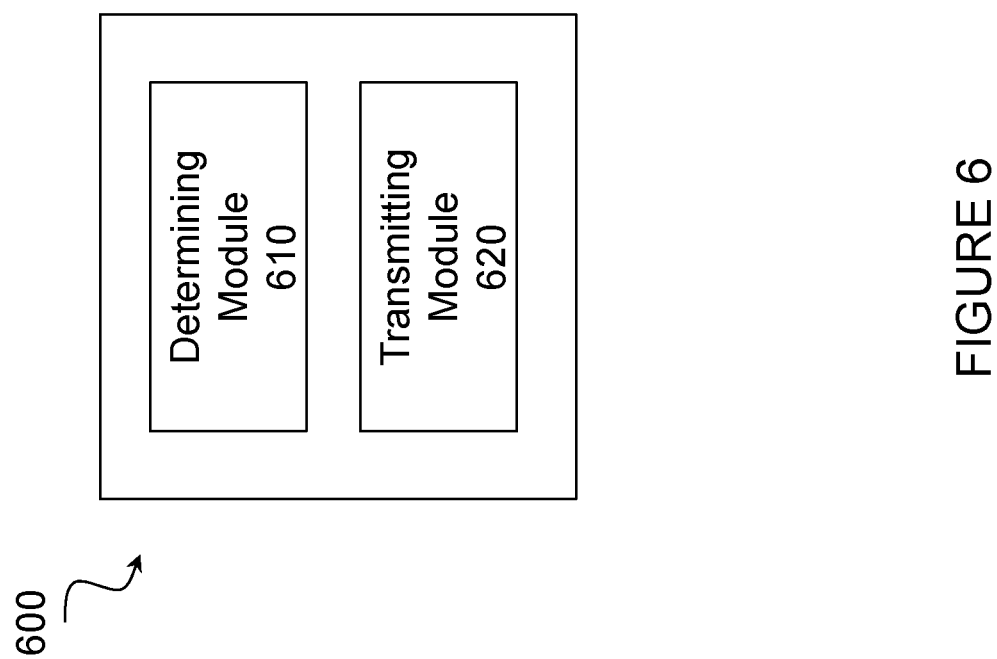
FIG. 6 illustrates a virtual computing device for providing access control information for ACDC, according to certain embodiments.

In certain embodiments, the method for accessing a network based on ACDC as described above may be performed by a virtual computing device. FIG. 6 illustrates an example virtual computing device 400 for accessing a network based on ACDC, according to certain embodiments. In certain embodiments, virtual computing device 600 may include modules for performing steps similar to those described above with regard to the method illustrated and described in FIG. 5. For example, virtual computing device 600 may include at least one determining module 610 and at least one transmitting module 620 and any other suitable modules for accessing a network based on ACDC. In some embodiments, one or more of the modules may be implemented using one or more processors 220 of FIG. 2. In certain embodiments, the functions of two or more of the various modules may be combined into a single module.

The determining module 610 may perform the determining functions of virtual computing device 600. For example, in certain embodiments, determining module 610 may determine ACDC barring information. The ACDC barring information may include at least one of an indication for a plurality of ACDC categories to a wireless device and a bitmap for a plurality of access classes. In a particular embodiment the particular indication for the particular ACDC category may include one bit. A first value for the one bit may indicate that the particular one of the plurality of ACDC categories is barred, whereas a second value for the one bit may indicate that the particular one of the plurality of ACDC categories is not barred. For example, a 0 may indicate that the ACDC category is barred and a 1 may indicate that the ACDC category is not barred. In a particular embodiment, the bitmap may include a plurality of bits, and each bit may indicate whether an associated one of a plurality of access classes is barred. The transmitting module 620 may perform the transmitting functions of virtual computing device 600. For example, in certain embodiments, transmitting module 620 may transmit the ACDC barring information to the wireless device. In a particular embodiment, the indication for each one of the plurality of ACDC categories may be transmitted in a first communication. The bitmap for the plurality of access classes may be transmitted in a second communication.

Other embodiments of virtual computing device 600 may include additional components beyond those shown in FIG. 6 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 7:
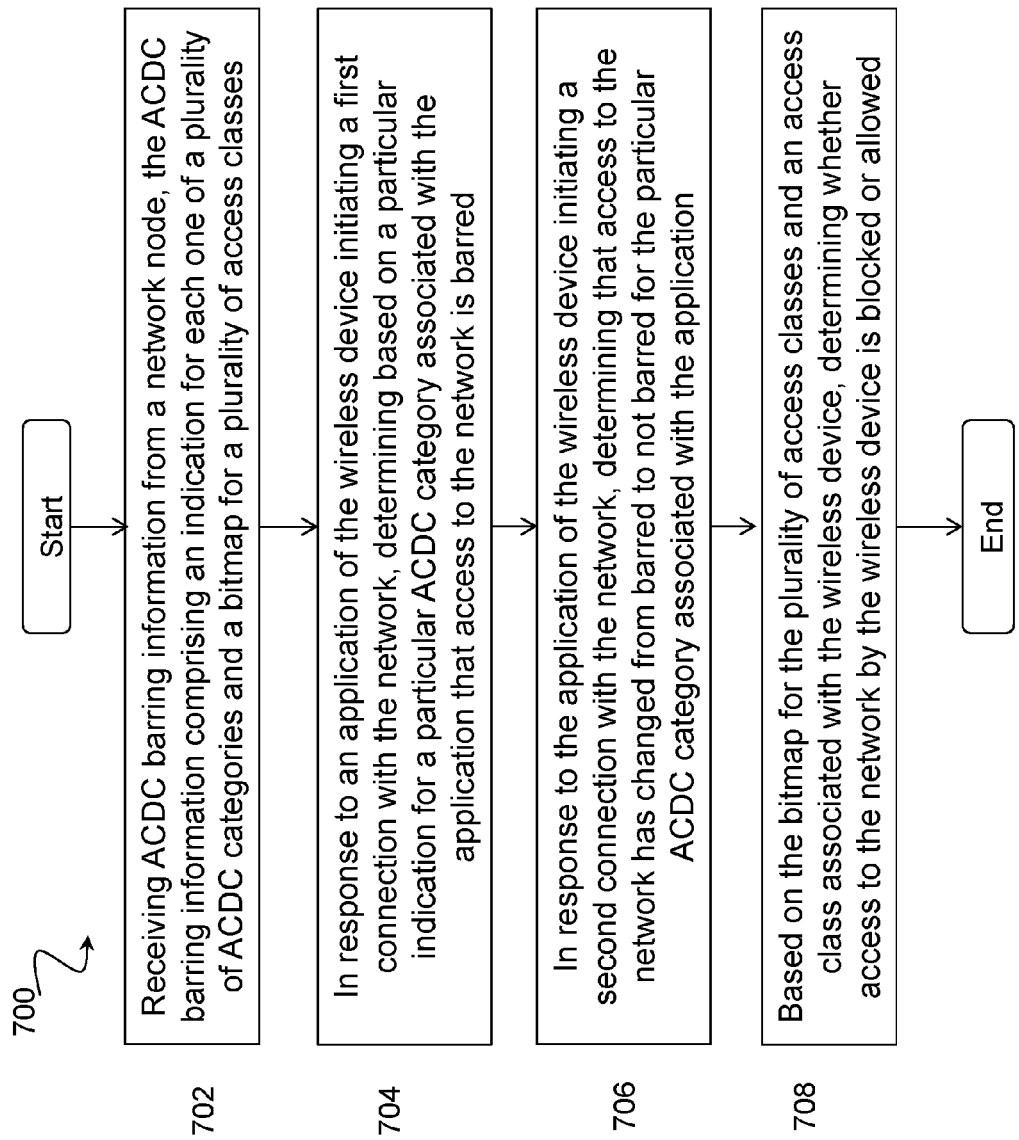
FIG. 7 illustrates an example method for accessing a network based on ACDC, according to certain embodiments.

FIG. 7 illustrates an example method 700 by a wireless device for accessing to a network based on ACDC, according to certain embodiments. The method begins at step 702 when wireless device 110 receives, from a network node 115, ACDC barring information. In certain embodiments, the ACDC barring information includes at least one of an indication for each one of a plurality of ACDC categories and a bitmap for a plurality of access classes. In a particular embodiment, receiving the ACDC barring information may include receiving a first communication that includes the indication for each one of the ACDC classes and receiving a second communication that includes the bitmap for the plurality of access classes.

In a particular embodiment, the particular indication for the particular ACDC category includes one bit that. For example, a first value for the one bit may indicate to the wireless device that the particular ACDC category is barred. By contrast, a second value for the one bit may indicate to the wireless device that the particular ACDC category is not barred.

In certain embodiments, the bitmap may include a plurality of bits. Each of the plurality of bits may indicate whether an associated one of the plurality of access classes is barred. In a particular embodiment, the bitmap may include access class barring information that is common to the plurality of ACDC categories.

At step 704, wireless device 110 may determine, based on a particular indication for a particular ACDC category associated with an application on the wireless device, that access to the network is barred. The determination may be in response to an application of the wireless device 110 initiating a first connection with network 100.

At step 706 and in response to the application of wireless device 110 initiating a second connection with the network 100, wireless device 110 determines that access to network 100 has changed from barred to not barred for the particular ACDC category associated with the application. In certain embodiments, the ACDC barring information may include information for a highest ACDC category that is barred. In such a scenario, determining that access to the network has changed from barred to not barred may include determining that the particular ACDC category to which the application is associated is higher than the highest ACDC category that is barred.

At step 708, wireless device 110 determines whether access to the network 100 is blocked or allowed based on the bitmap for the plurality of access classes and an access class associated with the wireless device 110.

Figure 8:
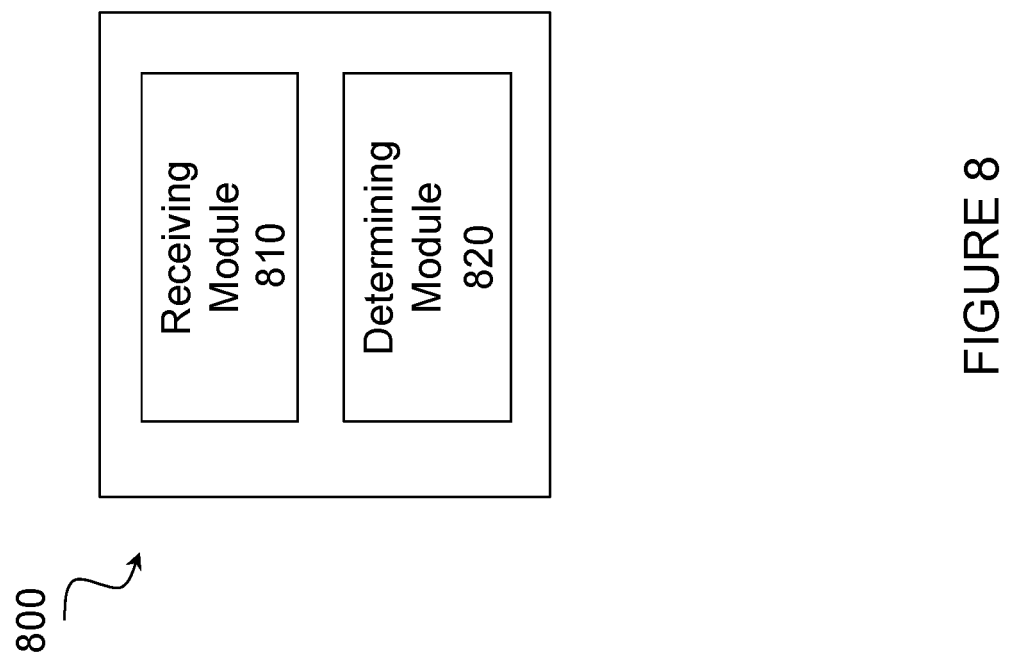
FIG. 8 illustrate a virtual computing device for accessing a network based on ACDC, according to certain embodiments.

In certain embodiments, the method for accessing a network based on ACDC as described above may be performed by a virtual computing device. FIG. 8 illustrates an example virtual computing device 800 for providing access to a network based on ACDC, according to certain embodiments. In certain embodiments, virtual computing device 800 may include modules for performing steps similar to those described above with regard to the method illustrated and described in FIG. 7. For example, virtual computing device 800 may include at least one receiving module 810, at least one determining module 820, and any other suitable modules for providing access to a network based on ACDC. In some embodiments, one or more of the modules may be implemented using one or more processors 320 of FIG. 3. In certain embodiments, the functions of two or more of the various modules may be combined into a single module.

The receiving module 810 may perform the receiving functions of virtual computing device 800. For example, receiving module 810 may receive ACDC barring information from network device 115. In certain embodiments, the ACDC barring information includes at least one of an indication for a plurality of ACDC categories and a bitmap for a plurality of access classes. In a particular embodiment, the ACDC barring information may be received in a first communication and the bitmap may be received in second communication such the two types of barring information are received periodically and alternatively.

The at least one determining module 820 may perform the determining functions virtual computing device 800. For example, in a particular embodiment, determining module 820 may determine that access to the network 100 is barred based on a particular indication for a particular ACDC category associated with the application. The determination may be in response to the application of the wireless device 110 initiating a first connection with network 100.

As another example, the at least one determining module 820 may, in response to the application of wireless device 110 initiating a second connection with the network 100, determine that access to network 100 has changed from barred to not barred for the particular ACDC category associated with the application. In certain embodiments, the ACDC barring information may include information for a highest ACDC category that is barred. In such a scenario, the at least one determining module 820 may determine that the particular ACDC category to which the application is associated is higher than the highest ACDC category that is barred.

As another example, the at least one determining module 820 may determine whether to access to network 100 is blocked or allowed based on the bitmap for the plurality of access classes and an access class associated with the wireless device 110.

Other embodiments of virtual computing device 800 may include additional components beyond those shown in FIG. 8 that may be responsible for providing certain aspects of the wireless device's 110 functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 9:
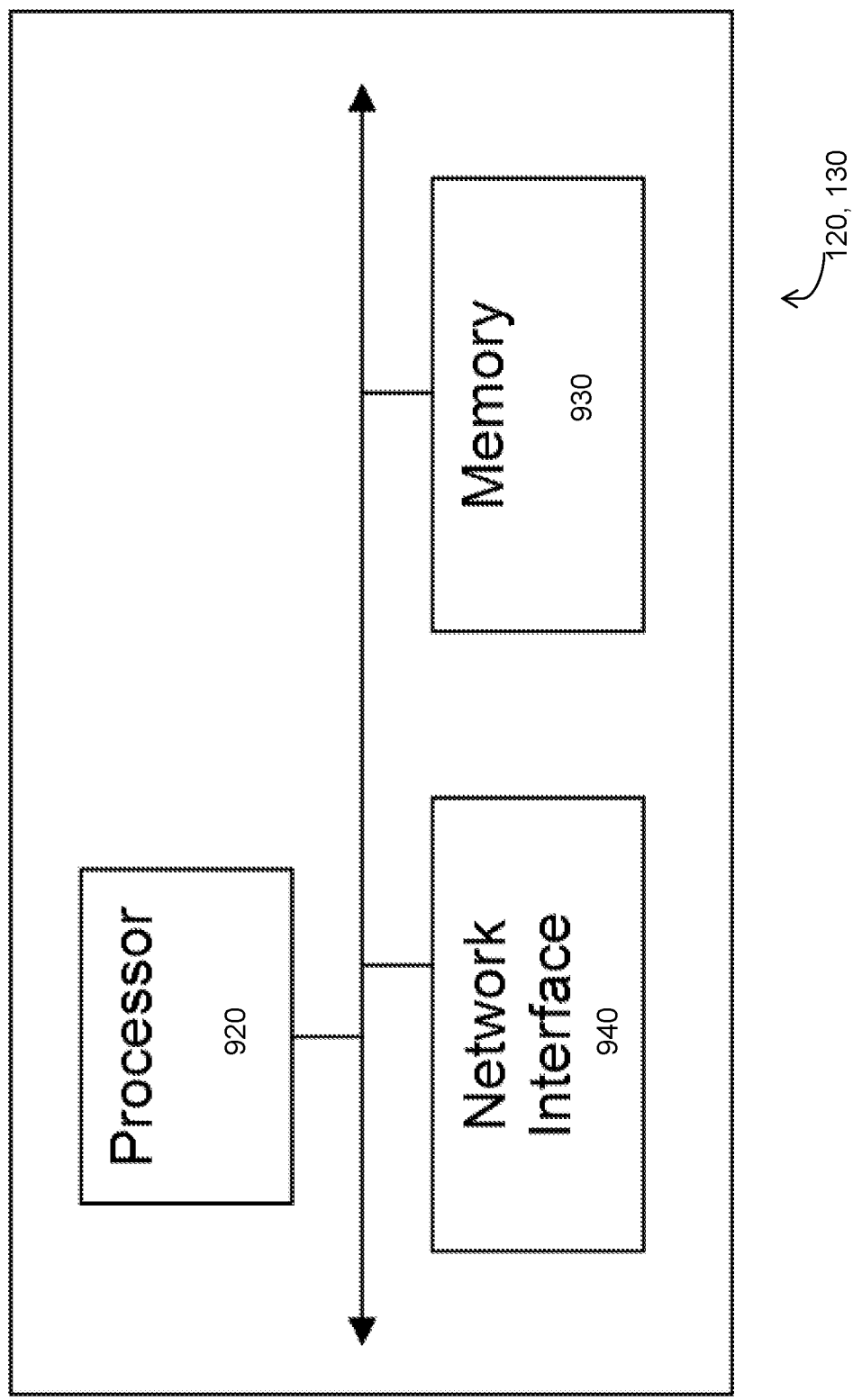
FIG. 9 illustrates an example radio network controller, according to certain embodiments.

FIG. 9 is a block diagram illustrating an exemplary radio network controller 120 or core network node 130, according to certain embodiments. Examples of network nodes can include a mobile switching center (MSC), a serving GPRS support node (SGSN), a mobility management entity (MME), a radio network controller (RNC), a base station controller (BSC), and so on. The network node includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to a suitable node, such as a gateway, switch, router, Internet, Public Switched Telephone Network (PSTN), radio network nodes 115, radio network controllers 120, core network nodes 130, etc.

Processor 920 may include any suitable combination of hardware and software implemented in one or more modules to execute instructions and manipulate data to perform some or all of the described functions of the network node. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

According to certain embodiments, a method by a network node is provided for providing access control information for Application-specific Congestion Control for Data Communication (ACDC). The method includes determining ACDC barring information that includes at least one of an indication for each one of a plurality of ACDC categories and a bitmap for a plurality of access classes. The network node transmits the ACDC barring information to a wireless device.

According to certain embodiments, a network node for providing access control information for Application-specific Congestion Control for Data Communication (ACDC), the network node includes a memory storing instructions and a processor operable to execute the instructions to cause the processor to determine ACDC barring information. The ACDC barring information includes at least one of an indication for each one of a plurality of ACDC categories and a bitmap for a plurality of access classes. The ACDC barring information is transmitted to a wireless device.

According to certain embodiments, a method by a wireless device is provided for determining access to a network based on Application-specific Congestion Control for Data Communication (ACDC). The method includes receiving ACDC barring information from a network node. The ACDC barring information includes at least one of an indication for each one of a plurality of ACDC categories and a bitmap for a plurality of access classes. In response to an application of the wireless device initiating a first connection with the network, wireless device determines based on a particular indication for a particular ACDC category associated with the application that access to the network is barred. In response to the application of the wireless device initiating a second connection with the network, the wireless device determines that access to the network has changed from barred to not barred for the particular ACDC category associated with the application. Based on the bitmap for the plurality of access classes and an access class associated with the wireless device, the wireless device determines whether access to the network by the wireless device is blocked or allowed.

According to certain embodiments, a wireless device includes a memory storing instructions for accessing a network based on Application-specific Congestion Control for Data Communication (ACDC) and a processor operable to execute the instructions to cause the processor to receive ACDC barring information from a network node. The ACDC barring information includes at least one of an indication for each one of a plurality of ACDC categories and a bitmap for a plurality of access classes. In response to an application of the wireless device initiating a first connection with the network, the processor determines based on a particular indication for a particular ACDC category associated with the application that access to the network is barred. In response to the application of the wireless device initiating a second connection with the network, the processor determines that access to the network has changed from barred to not barred for the particular ACDC category associated with the application. Based on the bitmap for the plurality of access classes and an access class associated with the wireless device, the processor determines whether access to the network by the wireless device is blocked or allowed.

Some embodiments of the disclosure may provide one or more technical advantages. For example, in certain embodiments, system information block (SIB) signaling overhead may be reduced. Another advantage may be that ACDC service requirements may be fulfilled. Still another advantage may be that the access barring schemes may not be limited to E-UTRAN but may be also applied to UTRAN. In certain embodiments, the serving network node may be able to simultaneously indicate ACDC with other forms of access control. Still another advantage may be that when both ACDC and access control block (ACB) controls are indicated ACDC shall override ACB. In the case of multiple core networks sharing the same access network, the access network shall be able to apply ACDC for the different core networks individually. For the mitigation of congestion in a shared RAN, barring rates may be set equal for all participating operators.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Other implementations may include a wireless communication device and/or access node configured to implement the described method, or a wireless communication system in which a wireless communication device and/or access node implement the described method.

Modifications, additions, or omissions may be made to the methods disclosed herein without departing from the scope of the invention. The methods may include more, fewer, or other steps. Additionally, steps may be performed in any suitable order.

The invention claimed is:

1. A method by a wireless device for determining access to a network based on Application-specific Congestion Control for Data Communication (ACDC), the method comprising:
    receiving ACDC barring information from a network node, the ACDC barring information comprising:
        an indication for each one of a plurality of ACDC categories; and
        for each one of the plurality of ACDC categories, a bitmap for a plurality of Access Control Barring classes;
    in response to an application of the wireless device initiating a first connection with the network, determining based on a particular indication for a particular ACDC category associated with the application that access to the network is barred;
    in response to the application of the wireless device initiating a second connection with the network:
        determining, by the wireless device, that access to the network has changed from barred to not barred for the particular ACDC category associated with the application; and
        based on the bitmap, associated with the particular ACDC category, for the plurality of Access Control Barring classes and an Access Control Barring class associated with the wireless device, determining whether access to the network by the wireless device is blocked or allowed.

2. The method of claim 1, wherein the particular indication for the particular ACDC category comprises one bit.

3. The method of claim 2, wherein:
    a first value for the one bit indicates to the wireless device that the particular ACDC category is barred; and
    a second value for the one bit indicates to the wireless device that the particular ACDC category is not barred.

4. The method of claim 1, wherein each bitmap comprises a plurality of bits, each of the plurality of bits indicating whether an associated one of the plurality of Access Control Barring classes is barred.

5. The method of claim 1, wherein receiving the ACDC barring information comprises:
   receiving a first communication comprising the indication for each one of the plurality of ACDC categories; and
   receiving a second communication comprising each of the bitmaps.

6. The method of claim 1, wherein:
   the ACDC barring information comprises information for a highest ACDC category that is barred; and
   wherein determining, by the wireless device, that access to the network has changed from barred to not barred comprises determining that the particular ACDC category to which the application is associated is higher than the highest ACDC category that is barred.

7. A wireless device comprising:
   a memory storing instructions for accessing a network based on Application-specific Congestion Control for Data Communication (ACDC); and
   a processor operable to execute the instructions to cause the processor to:
      receive, from a network node, ACDC barring information, the ACDC barring information comprising:
         an indication for each one of a plurality of ACDC categories; and
         for each one of the plurality of ACDC categories, a bitmap for a plurality of Access Control Barring classes;
      in response to an application of the wireless device initiating a first connection with the network, determine based on a particular indication for a particular ACDC category associated with the application that access to the network is barred;
      in response to the application of the wireless device initiating a second connection with the network,
         determine that access to the network has changed from barred to not barred for the particular ACDC category associated with the application; and
         based on the bitmap, associated with the particular ACDC category, for the plurality of Access Control Barring classes and an Access Control Barring class associated with the wireless device, determine whether access to the network by the wireless device is blocked or allowed.

8. The wireless device of claim 7, wherein the particular indication for the particular ACDC category comprises one bit.

9. The wireless device of claim 8, wherein:
   a first value for the one bit indicates to the wireless device that the particular ACDC category is barred; and
   a second value for the one bit indicates to the wireless device that the particular ACDC category is not barred.

10. The wireless device of claim 7, wherein each bitmap comprises a plurality of bits, each of the plurality of bits indicating whether an associated one of the plurality of Access Control Barring classes is barred.

11. The wireless device of claim 7, wherein receiving the ACDC barring information comprises:
   receiving a first communication comprising the indication for each one of the plurality of ACDC categories; and
   receiving a second communication comprising each of the bitmaps.

12. The wireless device of claim 7, wherein:
   the ACDC barring information comprises information for a highest ACDC category that is barred; and
   the processor is operable to determine that access to the network has changed from barred to not barred by determining that the particular ACDC category to which the application is associated is higher than the highest ACDC category that is barred.

13. A method by a network node for providing access control information for Application-specific Congestion Control for Data Communication (ACDC), the method comprising:
   determining, by the network node, ACDC barring information, the ACDC barring information comprising:
      an indication for each one of a plurality of ACDC categories; and
      for each one of the plurality of ACDC categories, a bitmap for a plurality of Access Control Barring classes; and
   transmitting, from the network node, the ACDC barring information to a wireless device.

14. The method of claim 13, wherein a particular indication for a particular ACDC category comprises one bit.

15. The method of claim 14, wherein:
   a first value for the one bit indicates to the wireless device that the particular ACDC category is barred; and
   a second value for the one bit indicates to the wireless device that the particular ACDC category is not barred.

16. The method of claim 13, wherein each bitmap comprises a plurality of bits, each of the plurality of bits indicating whether an associated one of a plurality of Access Control Barring classes is barred.

17. The method of claim 13, wherein
   transmitting the ACDC barring information to a wireless device comprises:
      transmitting a first communication comprising the indication for each one of the plurality of ACDC categories; and
      transmitting a second communication comprising each of the bitmaps.

18. A network node for providing access control information for Application-specific Congestion Control for Data Communication (ACDC), the network node comprising:
   a memory storing instructions; and
   a processor operable to execute the instructions to cause the processor to:
      determine ACDC barring information comprising:
         an indication for each one of a plurality of ACDC categories; and
         for each one of the plurality of ACDC categories, a bitmap for a plurality of Access Control Barring classes; and
      transmit the ACDC barring information to a wireless device.

19. The network node of claim 18, wherein a particular indication for a particular ACDC category comprises one bit.

20. The network node of claim 19, wherein:
   a first value for the one bit indicates to the wireless device that a particular ACDC category is barred; and
   a second value for the one bit indicates to the wireless device that the particular ACDC category is not barred.

21. The network node of claim 18, wherein when transmitting the ACDC barring information, the processor is operable to:
   transmit a first communication comprising the indication for each one of the plurality of ACDC categories; and
   transmit a second communication comprising each of the bitmaps.

* * * * *